(12) United States Patent
Karow (10) Patent No.: US 7,811,034 B1
(45) Date of Patent: Oct. 12, 2010

(54) SIMULTANEOUS PIPE CUTTING, CHAMFERING AND GROOVING DEVICE

(76) Inventor: Philip Karow, 8820 Karow Rd., Twin Lakes, WI (US) 53181

( * ) Notice: Subject to any disclaimer, the term of this patent is extended or adjusted under 35 U.S.C. 154(b) by 0 days.

(21) Appl. No.: 12/564,424

(22) Filed: Sep. 22, 2009

(51) Int. Cl.
*B23C 3/34* (2006.01)
*B23B 5/16* (2006.01)

(52) U.S. Cl. .................... 409/179; 409/192; 409/138; 409/200; 82/113; 82/131; 30/97; 29/33 T (58) Field of Classification Search ................ 409/179, 409/138, 199, 139, 140, 200, 192, 203, 213, 409/217; 82/113, 128, 131; 30/93, 94, 95, 30/96, 97, 100, 101; 29/33 T, 33 D; *B23C 3/34*
See application file for complete search history.

(56) References Cited

U.S. PATENT DOCUMENTS

| | | | |
|---|---|---|---|
| 3,277,788 A * | 10/1966 | Portal et al. .................... 409/71 |
| 3,675,291 A | 7/1972 | Girardin |
| 3,688,615 A * | 9/1972 | Protze et al. .................. 82/70.2 |
| 3,985,051 A * | 10/1976 | Brown ........................ 82/101 |
| 4,428,591 A | 1/1984 | Marissen et al. |
| 4,490,909 A * | 1/1985 | Wachs et al. .................... 30/97 |
| 4,682,919 A * | 7/1987 | Mitchell ...................... 409/179 |
| 5,159,756 A * | 11/1992 | McGuire ....................... 30/92 |
| 6,086,297 A | 7/2000 | Lotfi |
| 6,129,488 A | 10/2000 | Fahr |
| 6,352,288 B1 | 3/2002 | Calkins |
| 6,666,062 B2 * | 12/2003 | Dole et al. ..................... 72/121 |
| 2001/0001935 A1 * | 5/2001 | Wilk et al. ..................... 82/113 |
| 2004/0234352 A1 * | 11/2004 | Vanderpol et al. ........... 409/178 |
| 2009/0235532 A1 * | 9/2009 | Stratford-Smith ............ 30/102 |

FOREIGN PATENT DOCUMENTS

| | | | |
|---|---|---|---|
| JP | 63-150105 A | * | 6/1988 |
| JP | 2002-233908 A | * | 8/2002 |

OTHER PUBLICATIONS

Machine Translation of JP 2002-233908, which JP '908 was published in Aug. 2002.*
Certain Teed C900/RJ Engineering Specifications (4 pages), undated. <http://www.certainteed.com/resources/c900rjengineeringspecs.pdf>.

* cited by examiner

*Primary Examiner*—Erica E Cadugan
(74) *Attorney, Agent, or Firm*—Jansson Shupe & Munger Ltd.

(57) ABSTRACT

A mobile device for simultaneously cutting, chamfering and grooving a pipe. The device having a frame, at least one pipe collet-clamp attached to the frame and defining a principal axis, a split carriage rotatably mounted with respect to the frame about the axis and adjacent to the clamp(s), a router affixed to the split carriage and having a cutting-chamfering bit, a grooving router and a drive motor for rotating the carriage. The routers orbit around the pipe and simultaneously cuts the pipe into two chamfered pipes with grooves. A method is also provided for cutting through a pipe, chamfering the cut ends thereof and grooving the pipe.

20 Claims, 12 Drawing Sheets

SIMULTANEOUS PIPE CUTTING, CHAMFERING AND GROOVING DEVICE

FIELD OF THE INVENTION

This invention is related generally to devices for cutting, chamfering and grooving pipe and more particularly to devices that are mobile and can simultaneously cut through a pipe, chamfer the cut ends and cut a groove into the pipe.

BACKGROUND OF THE INVENTION

Devices which cut and chamfer pipe are used in numerous operations which require pipe to be cut to certain lengths and which also require the pipe after cutting to have a factory-like chamfer on the pipe ends. Such operations also may require that a pipe have grooves cut into the body of the pipe. Such cutting/chamfering/grooving devices in the prior art typically consist of a driving motor with a saw blade that is manually guided around the pipe to cut the pipe to the desired length. The pipe is then chamfered with a milling cutter in an additional process after it has been cut. If a groove is needed the pipe is manually cut with router, saw or rotary cutter to add a groove on the pipe body. The cutting/chamfering/grooving devices in the prior art perform the cutting, chamfering and grooving process as three individual steps. Each pipe end must be separately chamfered after it is cut and a groove must then be cut into the pipe body. Examples of prior art devices which pertain to cutting and chamfering pipe are disclosed in the following United States patents: U.S. Pat. No. 6,129,488 (Fahr) and U.S. Pat. No. 3,675,291 (Girardin). An example of a prior art device which pertains to grooving pipe is disclosed in U.S. Pat. No. 6,086,297 (Lotfi).

The devices of the prior art have, however, a number of problems and shortcomings. They often are not mobile and do not have the ability to field-cut pipe, chamfer the cut ends and groove the pipe all in one step. In comparison, the common practice is to manually cut through the pipe, next chamfer one end at a time using a cut-off saw and then using an abrasive cut-off saw groove each pipe. The devices in the prior art cannot add a groove to the pipe body unless it is manually done in an additional step with an abrasive cut-off saw. It would be desirable to have a cutting/chamfering/grooving device which is mobile and provides the ability to field-cut pipe, chamfer the cut ends and add a groove to the pipe body, all in one step through the use of a single tool. Having a device such as this would make the cutting/chamfering/grooving of a pipe efficient and not a time-consuming three-step process.

In addition, most cutting/chamfering/grooving devices of the prior art achieve a cut, bevel and groove that is inherently inconsistent and inferior. A primary concern is that a non-uniform bevel is more likely to cut seals used in pipe connections and create expensive waste of materials. Furthermore, it is an unsafe practice, not the least because a cut-off saw is not designed to be used as an angle grinder to make a chamfer. This can make the process inconsistent and inferior. It would be desirable to have a cutting/chamfering/grooving device which overcomes these problems by allowing the user to quickly and accurately cut, chamfer both cut ends and add a groove to the pipe body simultaneously on various sized pipes, including the most common pipe sizes used in construction (6", 8", 10" and 12") as well as pipes of larger sizes.

Additionally, most cutting/chamfering/grooving devices of the prior art employ practices which could be unsafe. It would also be desirable to have a cutting/chamfering/grooving device which is safe and easy to use during operation. A desirable feature would be to have a motor carriage hold the pipe in a secure manner and travel around the pipe rather than a pipe rotating around a cutter. A feature such as this would contribute to the safety of the device.

This invention meets these needs and overcomes other problems and shortcomings in the prior art with a cutting/chamfering/grooving device that is mobile, cuts/chamfers/grooves pipe in one step as well as quickly and accurately and is safe to operate.

OBJECTS OF THE INVENTION

It is an object of this invention to provide a cutting/chamfering/grooving device that is able to cut/chamfer/groove pipe in one step through the use of one tool, thereby making the device efficient and easy to use.

Another object is to provide a cutting/chamfering/grooving device that is mobile.

Yet another object is to provide a cutting/chamfering/grooving device that accurately cuts, chamfers and grooves pipe.

Still another object is to provide a cutting/chamfering/grooving device that can be operated in a safe manner.

These and other objects of the invention will be apparent from the following descriptions and from the drawings.

SUMMARY OF THE INVENTION

This invention is a mobile device for simultaneously cutting, chamfering and grooving a pipe. The mobile device comprises a frame, at least one pipe collet-clamp attached to the frame and defining a principal axis, a split carriage rotatably mounted with respect to the frame about the axis and adjacent to the clamp(s), a router affixed to the split carriage and having a cutting-chamfering bit, a grooving router and a drive motor for rotating the carriage. The routers orbit around the pipe and simultaneously cut the pipe into two chamfered and grooved pipes.

In highly preferred embodiments, pipe-end supports are attached to the frame on opposite sides of the router. It is preferred that the router has spring-loaded pipe-follower pins on either side of the bit to force the bit away from the pipe during out-of-round pipe conditions. Preferably, the router is spring-loaded thereby to accommodate out-of-round pipe conditions.

In highly preferred embodiments, the carriage has pipe-contact rollers thereon to facilitate relative rotation with the pipe. It is also highly preferred that the frame has carriage-guide rollers thereon to maintain the axial position of the carriage.

It is most preferred that the drive motor rotates the carriage in forward and reverse directions. In some embodiments, the device also includes a set of interchangeable collet-clamp(s) to accommodate common pipe sizes.

In some embodiments, the device includes a frame, at least one pipe support attached to the frame and defining with the pipe a principal axis, a split carriage mounted with respect to the frame about the axis and adjacent to and relatively rotatable with respect to the supported pipe, a router affixed to the split carriage and having a cutting-chamfering bit, a grooving router and a drive motor for motivating relative rotation of the pipe and the carriage.

Highly preferred embodiments include a bit for simultaneously cutting and chamfering a pipe which includes a shaft defining an axis and having a shank portion at its proximal end and a working portion at its distal end. Preferable the bit also includes a working portion which has a distal-most depth-cutting portion with (a) at least one axially-offset leading cutting edge at the circumference of the shaft and (b) a substantially axially-parallel lateral cutting edge extending from the distal end along the length of the depth-cutting portion. It is highly preferred that the working portion also include at least one chamfer-cutting portion between the depth-cutting portion and the shank portion.

Preferably the bit includes a relief void defined between the depth-cutting portion and the chamfer-cutting portion. The bit also includes a pair of leading cutting edges spaced by 180 degrees about the shaft axis. It is highly preferred that the bit has a pair of chamfer-cutting edges spaced by 180 degrees about the shaft axis.

The present invention also includes a method of cutting through a pipe, chamfering the cut ends thereof and grooving the pipe pieces. In this inventive method, the simultaneously cutting through a pipe, chamfering the cut ends of the pipe and grooving the pipe comprises the steps of supporting a pipe at axial locations on either side of an intended cutting zone on the pipe and orbiting a router having a cutting-chamfering bit 365 degrees around the pipe as well as orbiting a grooving router (365 degrees around the pipe) to simultaneously cut through the pipe, chamfer the cut ends and groove the pipe.

It is highly preferred that the method also includes clamping the pipe with pipe collet-clamps and a preliminary step of selecting from a collet-clamp set collet-clamps sized for the pipe to be cut. It is most preferred that the method also includes providing a split carriage rotatably mounted with respect to a frame about the pipe axis, the router being affixed to the split carriage and rotating the carriage about the clamped pipe.

The term "split carriage" as used herein refers to a carriage which can be opened to receive a pipe along the principle axis and securely closed with the pipe in place.

BRIEF DESCRIPTION OF THE DRAWINGS

The drawings illustrate a preferred embodiment including the above-noted characteristics and features of the invention. The device will be readily understood from the descriptions and drawings. In the drawings:

FIG. 10($a$) is a sectional view of the cutting-chamfering router bit of the pipe-cutting/chamfering/grooving device of FIG. 1;

FIG. 10($b$) is a perspective view of the cutting-chamfering router bit of the pipe-cutting/chamfering/grooving device of FIG. 1;

FIG. 10($c$) is a sectional view of the cutting-chamfering router bit of the pipe-cutting/chamfering/grooving device of FIG. 1;

FIG. 10($d$) is a further view of the cutting-chamfering router bit embodiment of FIG. 10C taken in the direction of line 10$d$-10$d$;

DETAILED DESCRIPTION OF PREFERRED EMBODIMENTS

FIGS. 1-14 illustrate a mobile device 10 for simultaneously cutting, chamfering and grooving a pipe 12 including a frame 48, at least one pipe collet-clamp 28 attached to the frame 48 and defining a principal axis 46, a split carriage 16 rotatably mounted with respect to the frame 48 about the axis 46 and adjacent to the clamp(s) 28, a router 38 affixed to the split carriage 16 and having a cutting-chamfering bit 14, a grooving router 74 for grooving pipe affixed to the frame 48 and a drive motor 18 for rotating carriage 16. As illustrated in FIGS. 1-4 and 13, router 38 and grooving router 74 orbit around pipe 12 simultaneously cutting it into two chamfered and grooved pipes 12.

FIGS. 1-4, 7, 11 and 13-14 illustrate that pipe-cutting/chamfering/grooving device 10 is the combination of the traveling carriage 16 which travels around pipe 12 and a custom-designed bit 14 (illustrated in FIG. 10($a$)) which simultaneously cuts pipe 12 and chamfers both cut ends quickly and accurately. As the pipe is rotating and being cut/chamfered a grooving router is simultaneously grooving the outside of pipe 12. Preferably the device includes two grooving routers 74, each grooving router 74 is attached to the carriage and has a grooving bit 76. Grooving router 74 is powered by a hydraulic system when grooving router 74 makes a plunge cut to groove pipe 12. Each grooving router 74 can be raised and lowered independent of the other routers. It is a significant commercial benefit to have at least one grooving router 74 included on device 10 for simultaneous cutting/chamfering/grooving.

Device 10 can operate with just a single grooving router 74 or with both grooving routers 74 grooving at the same time. Device 10 can also operate using a single grooving router 74 in conjunction with router 38 with the cutting/chamfering bit 14. If desired, device 10 can also operate with just router 38 running. Both the grooving routers 74 and router 38 are hydraulically operated. Grooving router(s) 74 are adjustable in that they are able to slide from left to right on carriage 16 to accommodate various pipe sizes and the desired location for the groove on the pipe 12.

Figure 10:
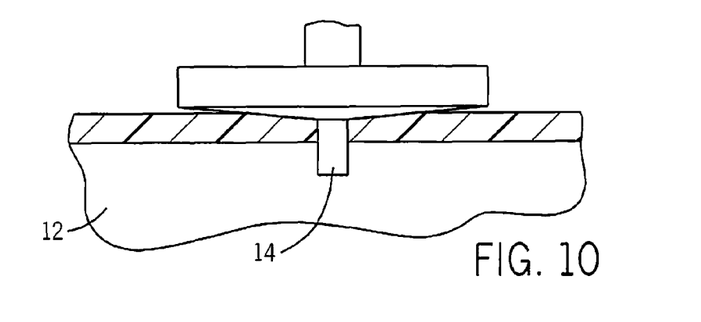
FIG. 10 is a perspective view of the cutting-chamfering router bit of the pipe-cutting/chamfering/grooving device of FIG. 1.

FIGS. 10-10($d$) illustrate custom-designed cutting-chamfering bit 14. During operation, pipe 12 remains stationary while carriage 16 rotates around the entire circumference of pipe 12 and then rotates back to the starting position.

Pipe-cutting/chamfering/grooving device 10 utilizes a single, custom-designed cutting-chamfering bit 14 that performs both the plunge cut and chamfer. By varying the depth and contour of bit 14, the pipe-cutting/chamfering/grooving device 10 could be useful in other fields that require chamfering, such as preparation of metal pipe for welding. When cutting metal pipe 12 the cutting speed and feed rates may be reduced.

Router 38 may be spring-loaded to maintain smooth cutting and/or beveling over imperfect surfaces (such as out-of-round pipe) and to avoid potential damage to the equipment as seen in FIGS. 7-10. The springs are located internally and apply downward pressure on bit 14. The springs are the main source of downward movement of bit 14.

Figures 10A, 10B, 10C, 10D:
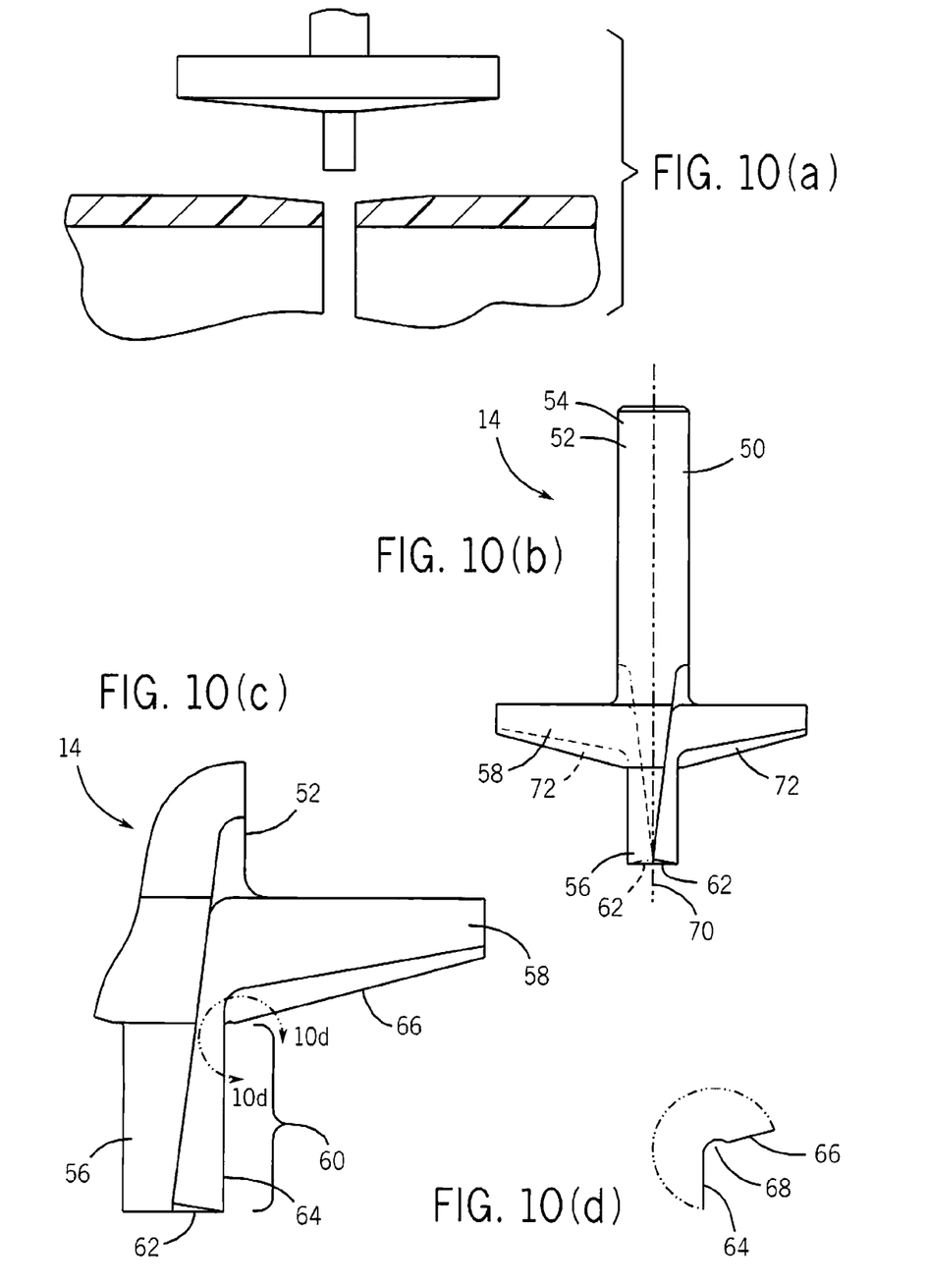
Figure 11:
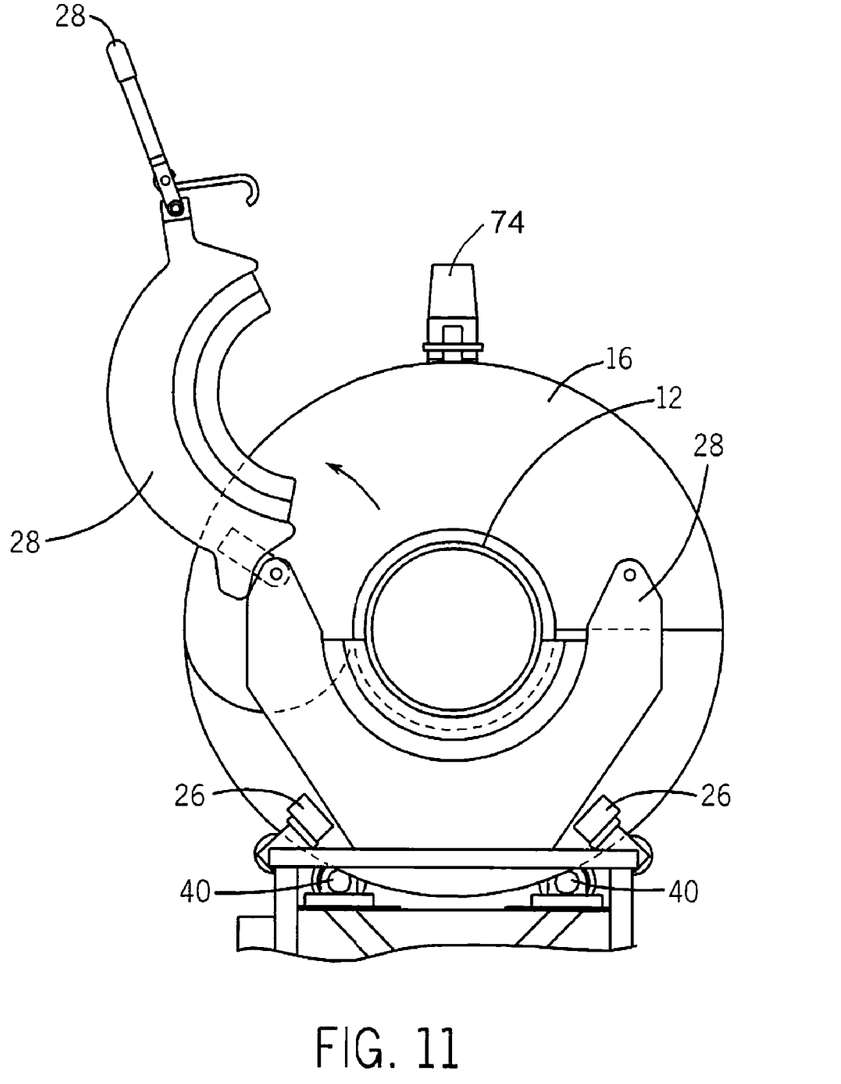
FIG. 11 is a side view of the pipe clamp of the pipe-cutting/chamfering/grooving device of FIG. 1 in the open position.

Bit 14 includes a shaft defining an axis 70 as seen in FIGS. 10(*b*)-10(*c*). Bit 14 includes a shank portion 52 at its proximal end 54 and a working portion 58 at its distal end 56 as illustrated in FIG. 10(*b*). Preferably, bit 14 also includes a working portion 58 which has a distal-most depth-cutting portion 60 with at least one axially-offset leading cutting edge 62 at the circumference of the shaft 50 and a substantially axially-parallel lateral cutting edge 64 extending from distal end 56 along the length of depth-cutting portion 60 as seen in FIGS. 10(*b*)-10(*d*). Working portion 58 also includes at least one chamfer-cutting portion 66 between depth-cutting portion 60 and shank portion 52.

FIGS. 10(*c*)-10(*d*) illustrate that bit 14 includes a relief void 68 defined between depth-cutting portion 60 and chamfer-cutting portion 66. Bit 14 also includes a pair of leading cutting edges 62 spaced by 180 degrees about the shaft axis 70. Bit 14 has a pair of chamfer-cutting edges 72 spaced by 180 degrees about the shaft axis 70.

As illustrated in FIGS. 1, 8 and 12-13, pipe-cutting/chamfering/grooving device 10 includes a carriage clamp 20 and also includes pipe-end supports 22 attached to the frame on opposite sides thereof. Pipe-end supports 22 are fully adjustable in height and length.

Figure 12:
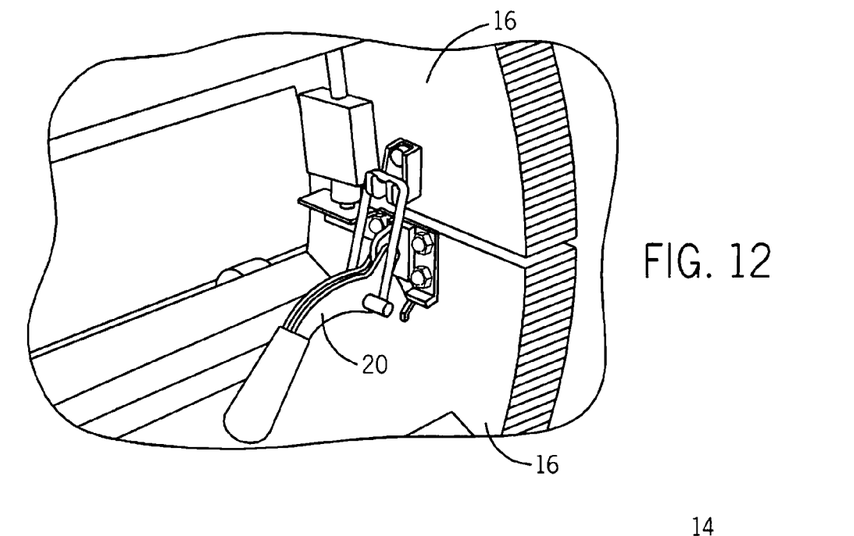
FIG. 12 is a perspective view of the carriage clamp of the pipe-cutting/chamfering/grooving device of FIG. 1.

Pipe-cutting/chamfering/grooving device can include one carriage clamp 20 or numerous carriage clamps 20. Carriage clamps 20 are quick-release, toggle-style clamps for quick opening and closing of carriage 16 as illustrated in FIG. 12.

Figure 1:
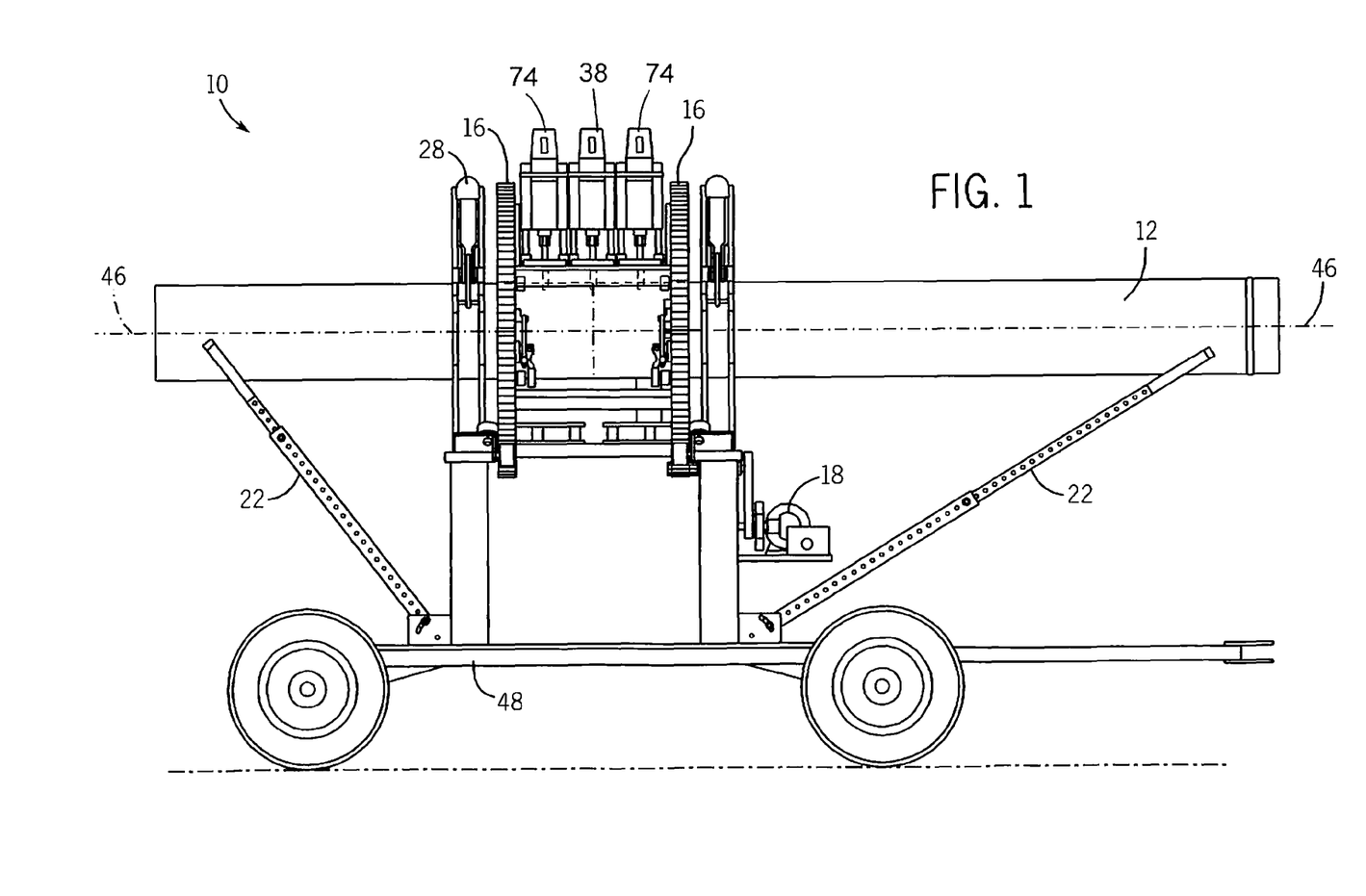
FIG. 1 is a perspective view of a pipe-cutting/chamfering/grooving device clamping a pipe.
Figure 2:
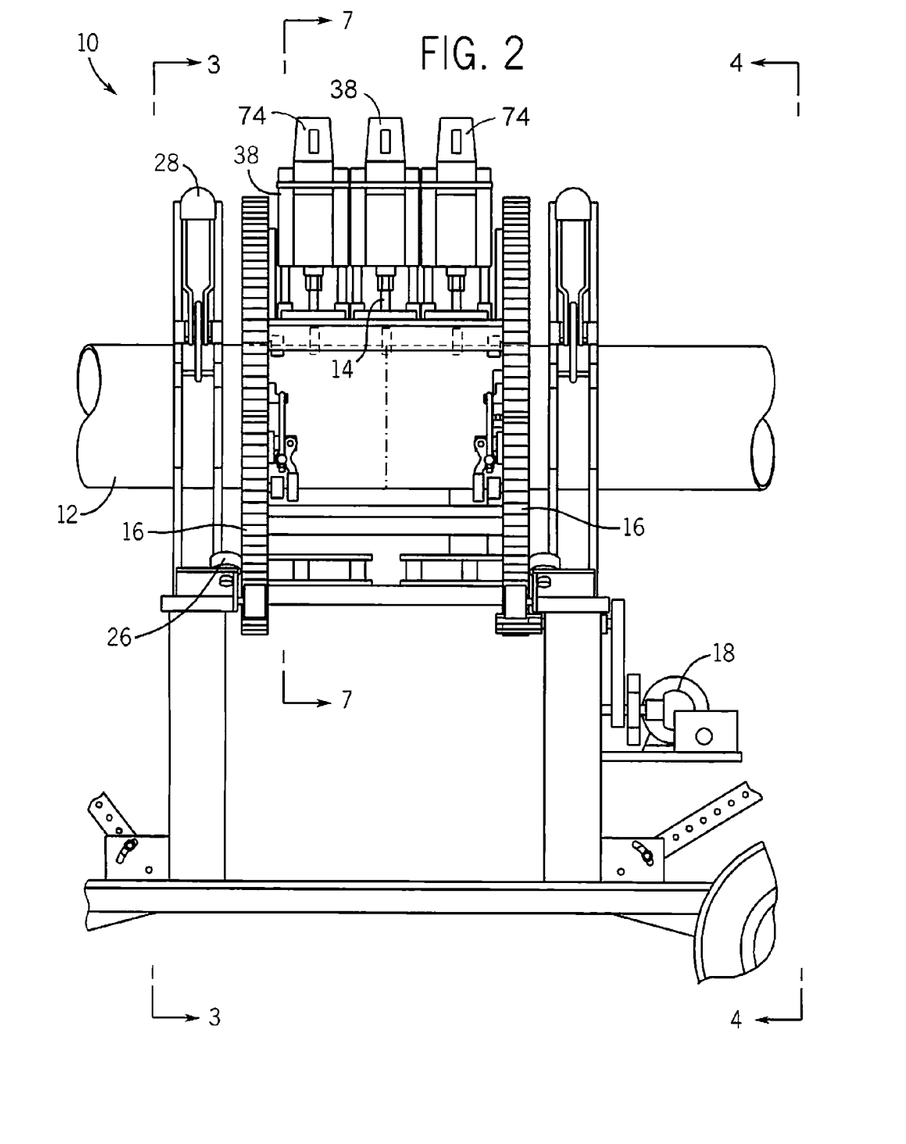
FIG. 2 is a perspective view of the pipe-cutting/chamfering/grooving device of FIG. 1.
Figure 3:
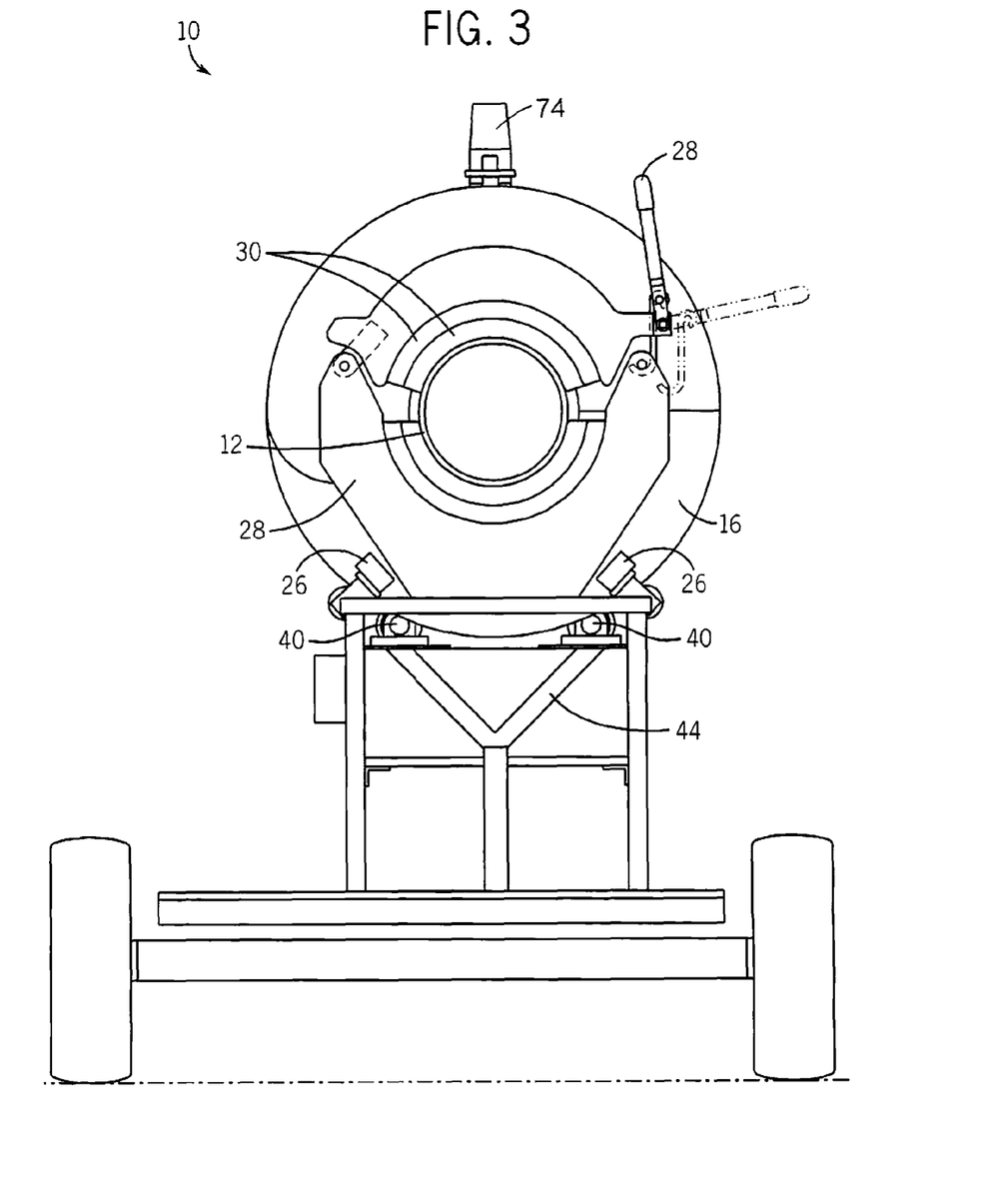
FIG. 3 is a section of the pipe-cutting/chamfering/grooving device taken along section line 3-3 of FIG. 2.
Figure 4:
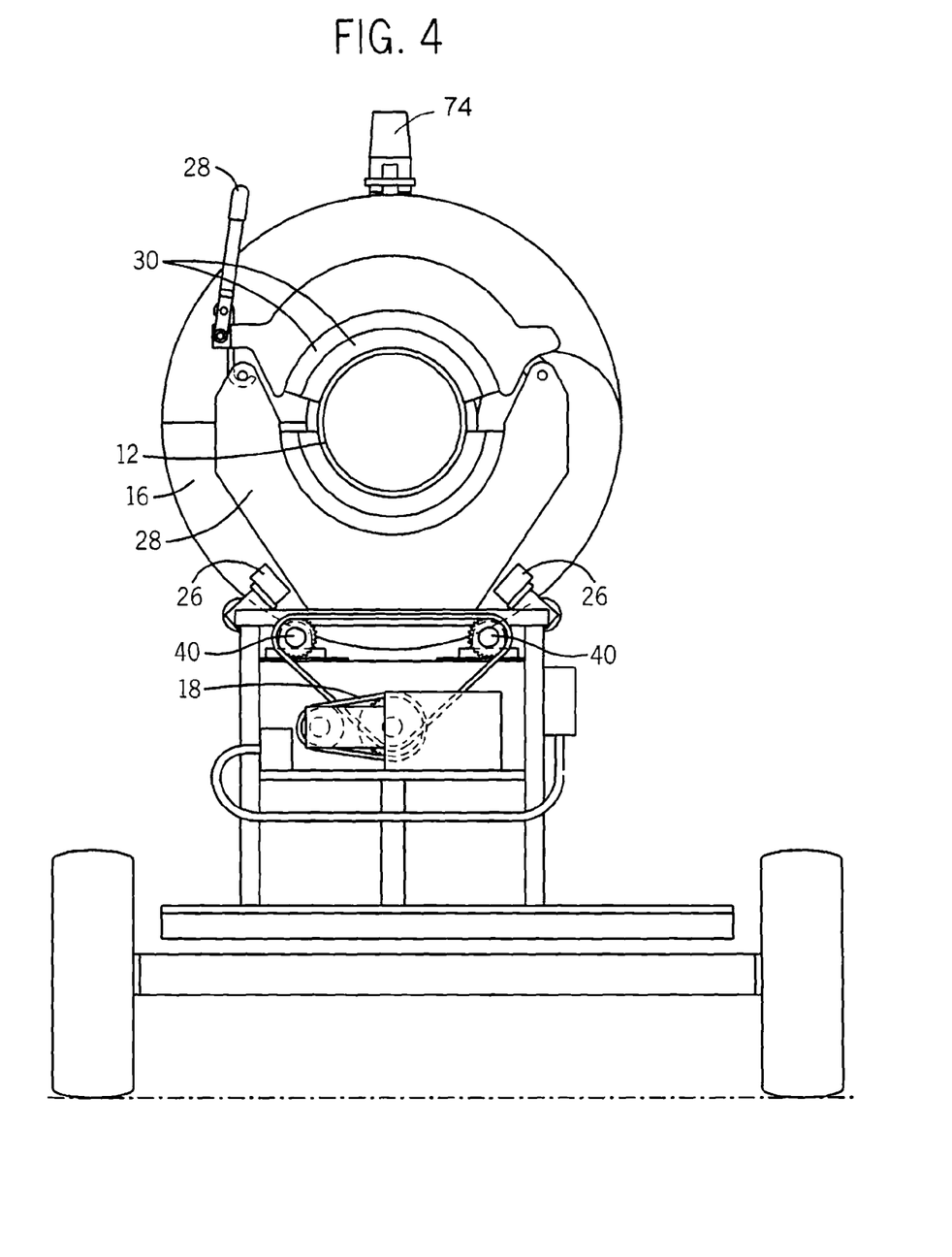
FIG. 4 is a section of the pipe-cutting/chamfering/grooving device taken along section line 4-4 of FIG. 2.

Pipe-cutting/chamfering/grooving device 10 can include one pipe collet-clamp 28 or numerous pipe collet-clamps 28. Pipe collet-clamps 28 are quick-release, toggle-style clamps for quick opening and closing of the clamp 28. Pipe collet-clamps 28 temporarily lock pipe 12 in a set position for cutting, chamfering and grooving as seen in FIGS. 1-3. An additional function of pipe collet-clamp 28 is to apply radial force to maintain a uniform pipe 12 diameter. Device 10 also includes a set of collets 30 which are removable and interchangeable to accommodate various common pipe sizes as seen in FIGS. 3-4.

Figure 6:
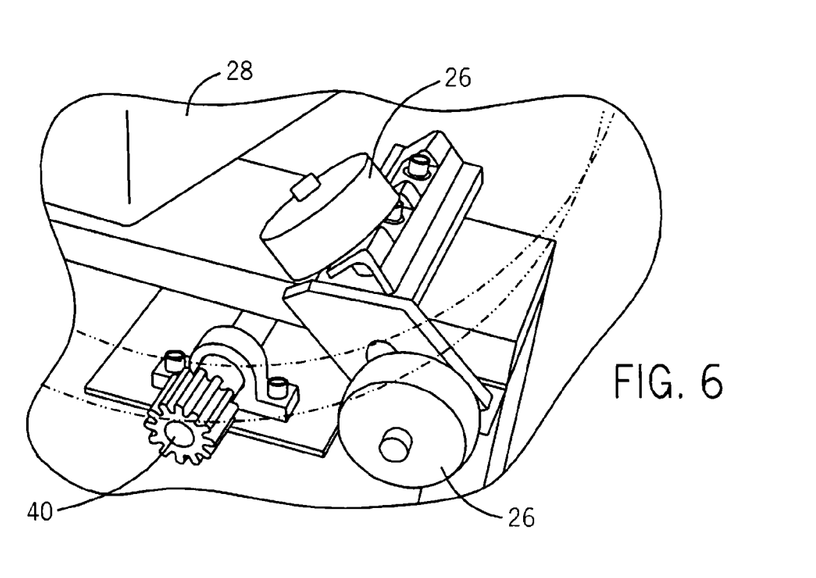
FIG. 6 is a perspective view of the carriage-guide rollers of the pipe-cutting/chamfering/grooving device of FIG. 1.
Figure 7:
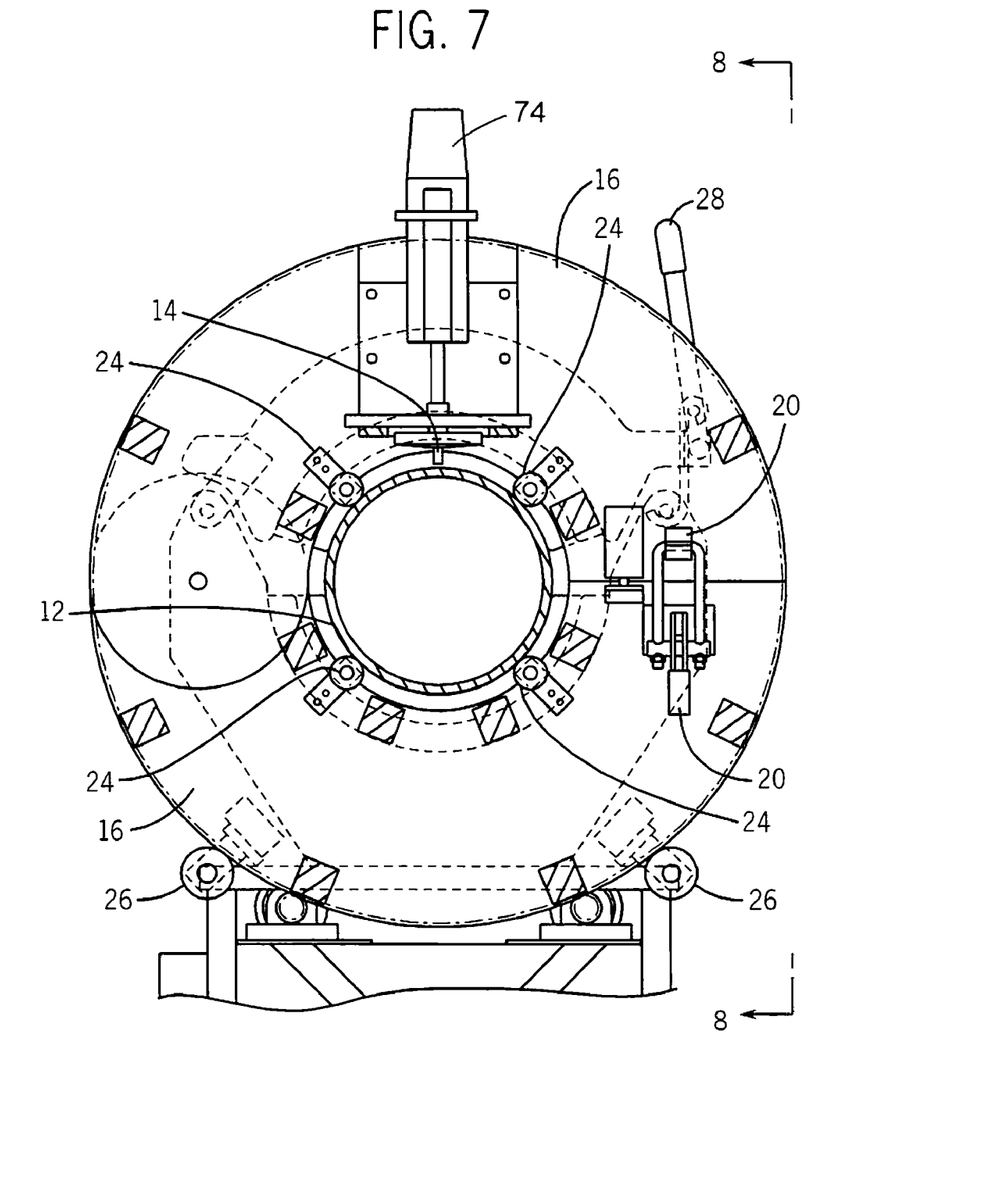
FIG. 7 is a section of the pipe-cutting/chamfering/grooving device taken along section line 7-7 of FIG. 2.
Figure 8:
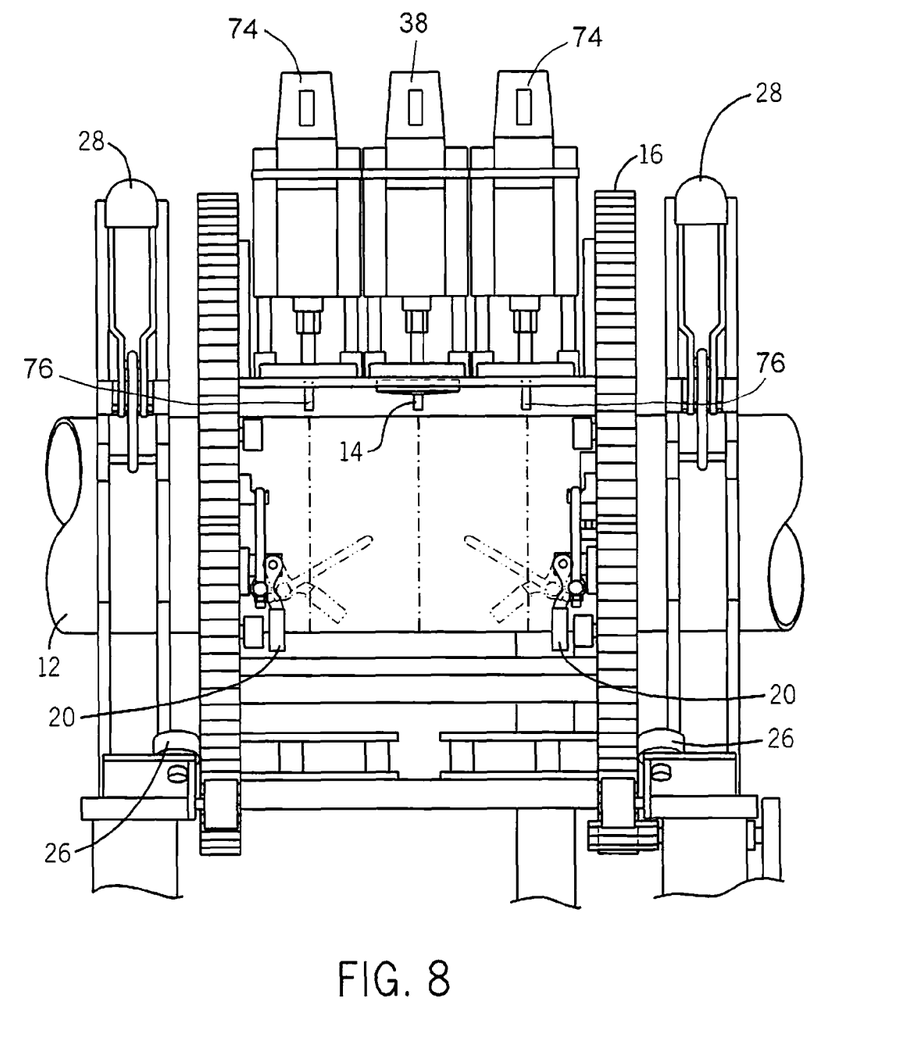
FIG. 8 is a section of the pipe-cutting/chamfering/grooving device taken along section line 8-8 of FIG. 7.
Figure 9:
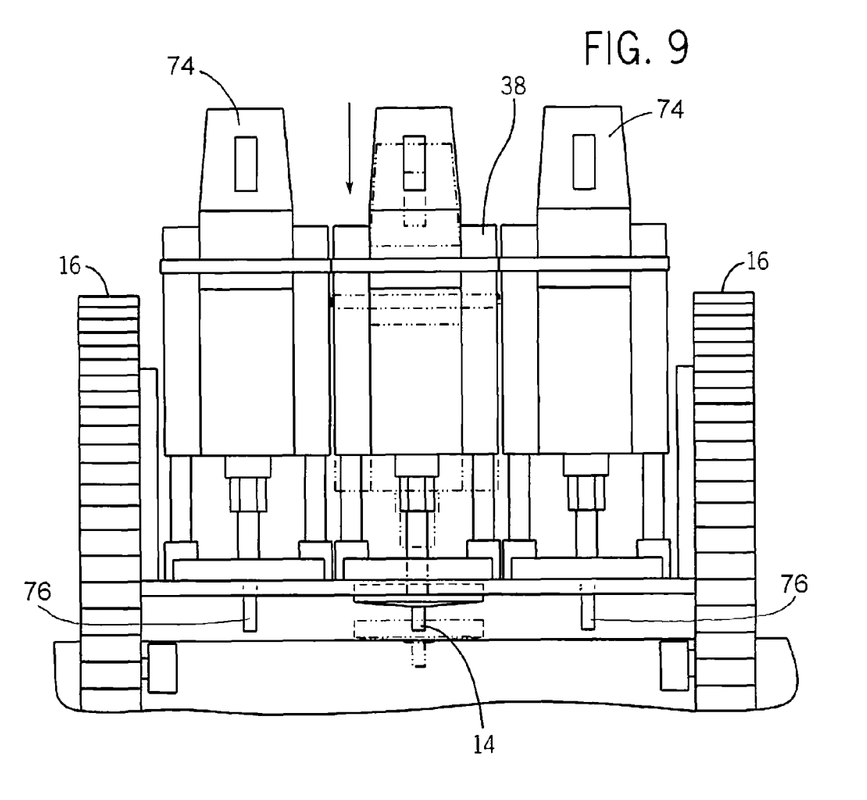
FIG. 9 is a perspective view of the routers and router bits of the pipe-cutting/chamfering/grooving device of FIG. 1.

FIGS. 2-4 and 6-7 illustrate that carriage 16 includes at least one pipe-contact roller 24 and at least one carriage-guide roller 26. Pipe-contact rollers 24 are illustrated in FIG. 7 and carriage-guide roller 26 are illustrated in FIG. 6. The function of pipe-contact rollers 24 is to facilitate relative rotation with the pipe as illustrated in FIG. 7. Pipe-contact rollers 24 are adjustable to accommodate common size pipe 12 diameters.

Figure 13:
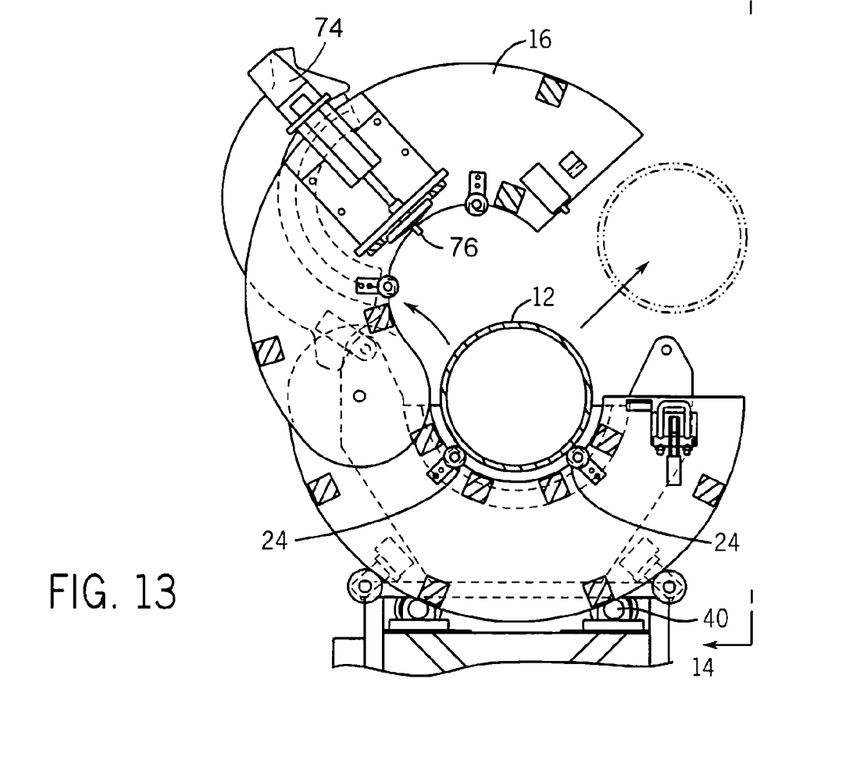
FIG. 13 is a side view of the carriage and pipe collet-clamp of the pipe-cutting/chamfering/grooving device of FIG. 1 in the open position.

The function of carriage-guide rollers 26 is to maintain the axial position of the carriage 16 as seen in FIG. 6. Carriage-guide rollers 26 are fully adjustable and maintain lateral load on both sides of carriage 16 to ensure straight cutting of pipe 12. Additionally, carriage-guide rollers 26 support carriage 16 while it is in an open position allowing for removal and installation of pipe 12 as seen in FIG. 13.

Operation of the pipe-cutting/chamfering/grooving device 10 is safe and easy to use. Rather than a pipe 12 rotating around a bit 14 or other cutting/grooving device, carriage 16 of the pipe-cutting/chamfering/grooving device 10 holds pipe 12 securely and travels around pipe 12 as seen in FIGS. 1-4. In some embodiments, power cord and retractable cord real (not shown) allow power cord to extend and retract with carriage 16. In preferred embodiments, a hose track system (not shown) is utilized in place of a power cord and retractable cord reel. Hose track system (not shown) also allows power cord to extend and retract without interfering with the pipe-cutting/chamfering/grooving device 10. Each of these features contribute to the safety of device 10.

Carriage 16 is gear-driven and includes a pivotal yoke 44 which allows pinion gears 40 to maintain optimum gear engagement as seen in FIG. 3. Pivotal yoke 44 allows pinion gears 40 to move freely side to side and up and down on carriage 16 to ensure positive gear contact at all times.

Figure 14:
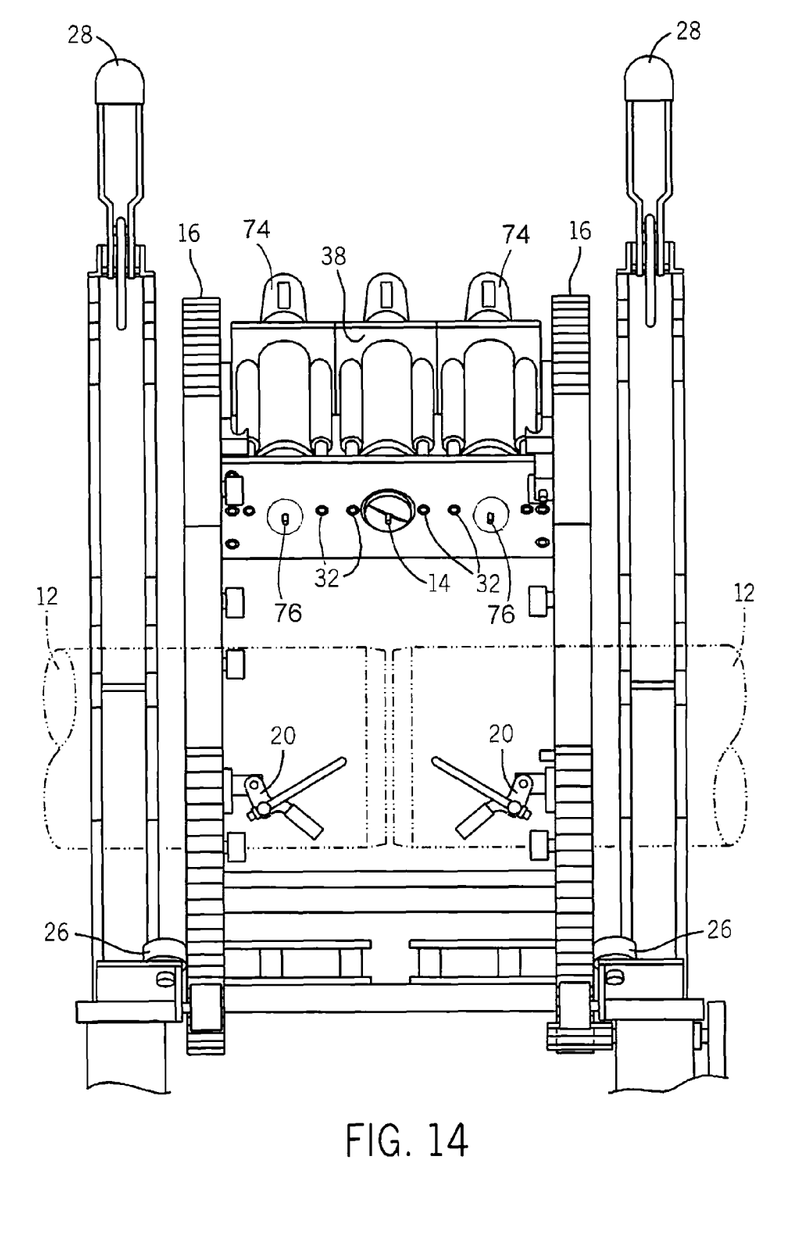
FIG. 14 is section of the pipe-cutting/chamfering/grooving device taken along section line 14-14 of FIG. 13.

Router 38 also has spring-loaded pipe-follower pins 32 on either side of the bit 14 to force the bit 14 away from the pipe 12 during out-of-round pipe conditions as seen in FIGS. 10 and 14. Pipe-follower-pins 32 allow bit 14 to be mechanically raised and lowered following the outside contour of pipe 12 as illustrated in FIG. 14. Router 38 and bit 14 are manually raised and lowered by activating handle 42. In an alternate embodiment, router 38 and bit 14 are raised and lowered pneumatically by two pneumatic cylinders.

Figure 5:
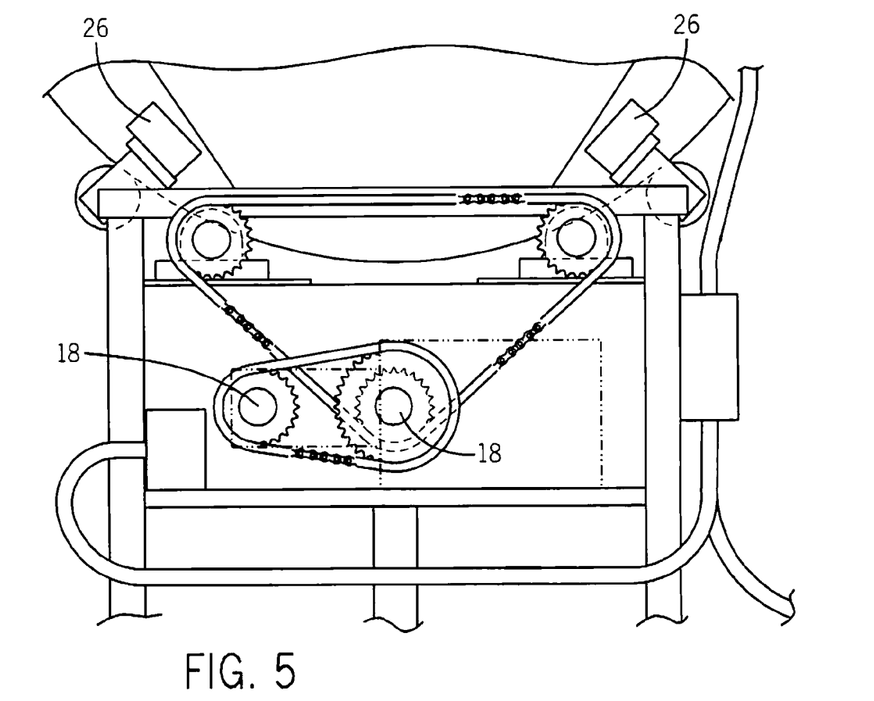
FIG. 5 is a perspective view of the drive motor of the pipe-cutting/chamfering/grooving device of FIG. 1.

Pipe-cutting/chamfering/grooving device 10 includes a drive motor 18 which advances carriage 16 in a forward direction and in a reverse direction as illustrated in FIG. 5. Drive motor 18 is preferably chain driven. Pipe-cutting/chamfering/grooving device 10 also includes control panel (not shown) for operation of device 10. It is highly preferred that the control panel include an LCD display with a user interface touch screen. In other embodiments, the control panel can include easy-to-use electrical controls and display as well as an emergency stop button.

Pipe-cutting/chamfering/grooving device 10 can simultaneously cut through a pipe 12 and chamfer the cut ends as illustrated in FIG. 10(*a*). A user would first support a pipe 12 at axial 46 locations on either side of an intended cutting zone on the pipe 12. Next user would orbit a router 38 and at least one grooving router 74 around pipe 12. Router 38 has a cutting-chamfering bit 14, which orbits 365 degrees around pipe 12 to simultaneously cut through pipe 12 and chamfer the cut ends. Grooving router 74 includes a grooving bit 76 for grooving pipe 12. Grooving router 74 also orbits 365 degrees around pipe 12 at the same time router 38 is orbiting. Grooving router 74 simultaneously grooves the two resulting pipe 12 pieces.

The supporting step can also include clamping pipe 12 with pipe collet-clamps 28. The orbiting step can also include providing a split carriage 16 rotatably mounted with respect to a frame 48 about the pipe axis 46, router 38 can be affixed to the split carriage 16 and carriage 16 rotates about clamped pipe 12.

Another aspect of this invention is that a preliminary step can include selecting from a collet-clamp 28 set collet-clamps 28 sized for the pipe 12 to be cut.

Pipe-cutting/chamfering/grooving device 10 has many unique advantages. Device 10 is mobile and provides the ability to field-cut pipe 12, chamfer the cut ends and groove each pipe 12 piece with one tool and in one step as opposed to the common practice of manually cutting through a pipe 12, chamfering one pipe end at a time using a cut-off saw and then manually grooving each pipe 12 piece. The cut and bevel achieved by the hand-operated method is inherently inconsistent and inferior. A primary concern is that a non-uniform bevel is more likely to cut seals used in pipe connections and create expensive waste of materials. Furthermore, it is an unsafe practice, not the least because a cut-off saw is not designed to be used as an angle grinder.

The pipe-cutting/chamfering/grooving device 10 overcomes these problems by allowing the user to quickly and accurately cut, chamfer and groove pipe simultaneously on various sized pipes, including the most common pipe sizes used in construction 6", 8" and 10" as well as other sizes including 12", 15" and 18" and also larger pipe sizes, 21", 24" and 30". Furthermore, the pipe-cutting/chamfering/grooving device 10 can accommodate lengths of pipe 12 as short as one foot (for beveling a single end) and as short as two feet in cutting and beveling both cut ends simultaneously as well as grooving the pipe pieces.

Pipe-cutting/chamfering/grooving device 10 can simultaneously cut, chamfer and groove pipe made out of various materials, included but not limited to, plastic, polyvinyl chloride plastic and metal.

A wide variety of materials are available for the various parts discussed and illustrated herein. Although the device has been shown and described in conjunction with specific embodiments thereof, it is to be understood that many alternatives, modifications and variations will be apparent to those skilled in the art. Accordingly, it is intended to embrace all such alternatives, modifications and variations that fall within the spirit and broad scope of the appended claims.

The invention claimed is:

1. A mobile device for simultaneously cutting, chamfering and grooving a pipe, the improvement comprising:
   a frame;
   at least one pipe collet-clamp attached to the frame and defining a principal axis;
   a split carriage rotatably mounted with respect to the frame about the axis and adjacent to the clamp(s);
   a router affixed to the split carriage and having a cutting-chamfering bit;
   a grooving router affixed to the split carriage for grooving the pipe; and
   a drive motor for rotating the carriage;
   whereby the routers orbit around the pipe simultaneously cutting it into two chamfered pipes, at least one of which is grooved.

2. The device of claim 1 further comprising pipe-end supports attached to the frame on opposite sides thereof.

3. The device of claim 1 wherein the cutting and chamfering router has spring-loaded pipe-follower pins on either side of the bit to force the bit away from the pipe during out-of-round pipe conditions.

4. The device of claim 1 wherein the routers are biased to accommodate out-of-round pipe conditions.

5. The device of claim 4 wherein the cutting and chamfering router has spring-loaded pipe-follower pins on either side of the bit to force the bit away from the pipe during out-of-round pipe conditions.

6. The device of claim 1 wherein the carriage has pipe-contact rollers thereon to facilitate relative rotation with the pipe.

7. The device of claim 1 wherein the frame has carriage-guide rollers thereon to maintain the axial position of the carriage.

8. The device of claim 1 wherein the drive motor rotates the carriage in forward and reverse directions.

9. The device of claim 1 further including a set of interchangeable collet-clamps to accommodate common pipe sizes.

10. A method of simultaneously cutting through a pipe, chamfering the cut ends thereof and grooving at least one of the resulting pipes, the method comprising the steps of providing a frame, at least one pipe-collet clamp attached to the frame and defining a principal axis, a split carriage rotatably mounted with respect to the frame about the axis and adjacent to the clamp(s), and a drive motor for rotating the carriage, supporting the pipe with the at least one pipe-collet clamp at axial locations on either side of an intended cutting/grooving zone on the pipe, orbiting a cutting-chamfering router having a bit about 365 degrees around the pipe and orbiting a grooving router having a bit, wherein the routers are affixed to the split carriage, the routers simultaneously cutting the pipe into two chamfered pipes, at least one of which is grooved.

11. The method of claim 10 wherein the supporting step comprises clamping the pipe with the pipe collet-clamps.

12. The method of claim 11 wherein the orbiting step comprises:
   actuating the drive motor to rotate the carriage about the clamped pipe.

13. The method of claim 11 including the preliminary step of selecting from a collet-clamp set collet-clamps sized for the pipe to be cut.

14. A device for simultaneously cutting and chamfering a pipe, the improvement comprising:
   a frame;
   at least one pipe support attached to the frame and defining with the pipe a principal axis;
   a split carriage mounted with respect to the frame about the axis and adjacent to and relatively rotatable with respect to the supported pipe;
   a router affixed to the split carriage and having a cutting-chamfering bit;
   a grooving router affixed to the split carriage for grooving the pipe; and
   a drive motor for rotating the carriage;
   whereby the routers orbit around the pipe simultaneously cutting it into two chamfered pipes, at least one of which is grooved.

15. In a mobile device for simultaneously cutting and chamfering a pipe having a frame, at least one pipe collet-clamp attached to the frame and defining a principal axis, a split carriage rotatably mounted with respect to the frame about the axis and adjacent to the clamp(s), a router affixed to the split carriage and having a cutting-chamfering bit and a drive motor for rotating the carriage, the improvement wherein a grooving router affixed to the split carriage for grooving the pipe and the router orbit around the pipe simultaneously cutting it into two chamfered pipes, at least one of which is grooved.

16. The device of claim 15 further comprising pipe-end supports attached to the frame on opposite sides thereof.

17. The device of claim 15 wherein the cutting and chamfering router has spring-loaded pipe-follower pins on either side of the bit to force the bit away from the pipe during out-of-round pipe conditions.

18. The device of claim 15 wherein the routers are biased to accommodate out-of-round pipe conditions.

19. The device of claim 18 wherein the cutting and chamfering router has spring-loaded pipe-follower pins on either side of the bit to force the bit away from the pipe during out-of-round pipe conditions.

20. The device of claim 15 wherein the carriage has pipe-contact rollers thereon to facilitate relative rotation with the pipe.

* * * * *